United States Patent
Maisonnier et al.

(10) Patent No.: US 7,186,359 B2
(45) Date of Patent: Mar. 6, 2007

(54) METHOD FOR PREPARING A LATEX WITH PHOTOCHROMIC PROPERTIES AND USES THEREOF, PARTICULARLY IN OPHTHALMOLOGY

(75) Inventors: Sylvette Maisonnier, Moisselles (FR); Pascale Tardieu, Paris (FR); Jean-Paul Cano, Chennevieres sur marne (FR); Georges Wajs, Ivry sur Seine (FR); Jean-Pierre Vairon, Bourg la Reine (FR); Bernadette Charleux, Vincennes (FR)

(73) Assignee: Essilor International Compagnie Generale d'Optique, Charenton Cedex (FR)

( * ) Notice: Subject to any disclaimer, the term of this patent is extended or adjusted under 35 U.S.C. 154(b) by 553 days.

(21) Appl. No.: 09/939,151

(22) Filed: Aug. 24, 2001

(65) Prior Publication Data

US 2002/0128339 A1    Sep. 12, 2002

Related U.S. Application Data

(63) Continuation of application No. PCT/FR00/00397, filed on Feb. 17, 2000.

(30) Foreign Application Priority Data

Feb. 26, 1999  (FR) .................................. 99 02437

(51) Int. Cl.
G02B 5/23    (2006.01)

(52) U.S. Cl. ...................................... 252/586; 351/163
(58) Field of Classification Search ................ 252/586; 351/163
See application file for complete search history.

(56) References Cited

U.S. PATENT DOCUMENTS

| | | | | |
|---|---|---|---|---|
| 4,489,108 A | * | 12/1984 | Postle et al. ................. | 252/586 |
| 4,503,177 A | * | 3/1985 | Reid et al. ................... | 252/586 |
| 4,578,305 A | * | 3/1986 | Postle et al. ................. | 428/212 |
| 6,740,699 B2 | * | 5/2004 | Tardieu et al. .............. | 524/481 |
| 2002/0143088 A1 | * | 10/2002 | Robert et al. ................ | 524/379 |

FOREIGN PATENT DOCUMENTS

| | | |
|---|---|---|
| EP | 0346484 | 12/1989 |
| EP | 0873881 | 10/1998 |
| GB | 2270321 | 3/1994 |
| JP | 2020575 | 1/1990 |
| JP | 10-25471 | * 1/1998 |
| RU | 2095836 C1 | 11/1997 |

OTHER PUBLICATIONS

Co-pending U.S. Appl. No. 09/991,773, filed Nov. 16, 2001, filed Sylvette Maisonnier et al.

* cited by examiner

*Primary Examiner*—Philip C. Tucker
(74) *Attorney, Agent, or Firm*—Fulbright & Jaworski L.L.P.

(57) ABSTRACT

This invention relates to a method for preparing a photochromic latex, photochromic thin films obtained therefrom, and articles coated with such thin films, in particular photochromic ophthalmic lenses.

41 Claims, 2 Drawing Sheets

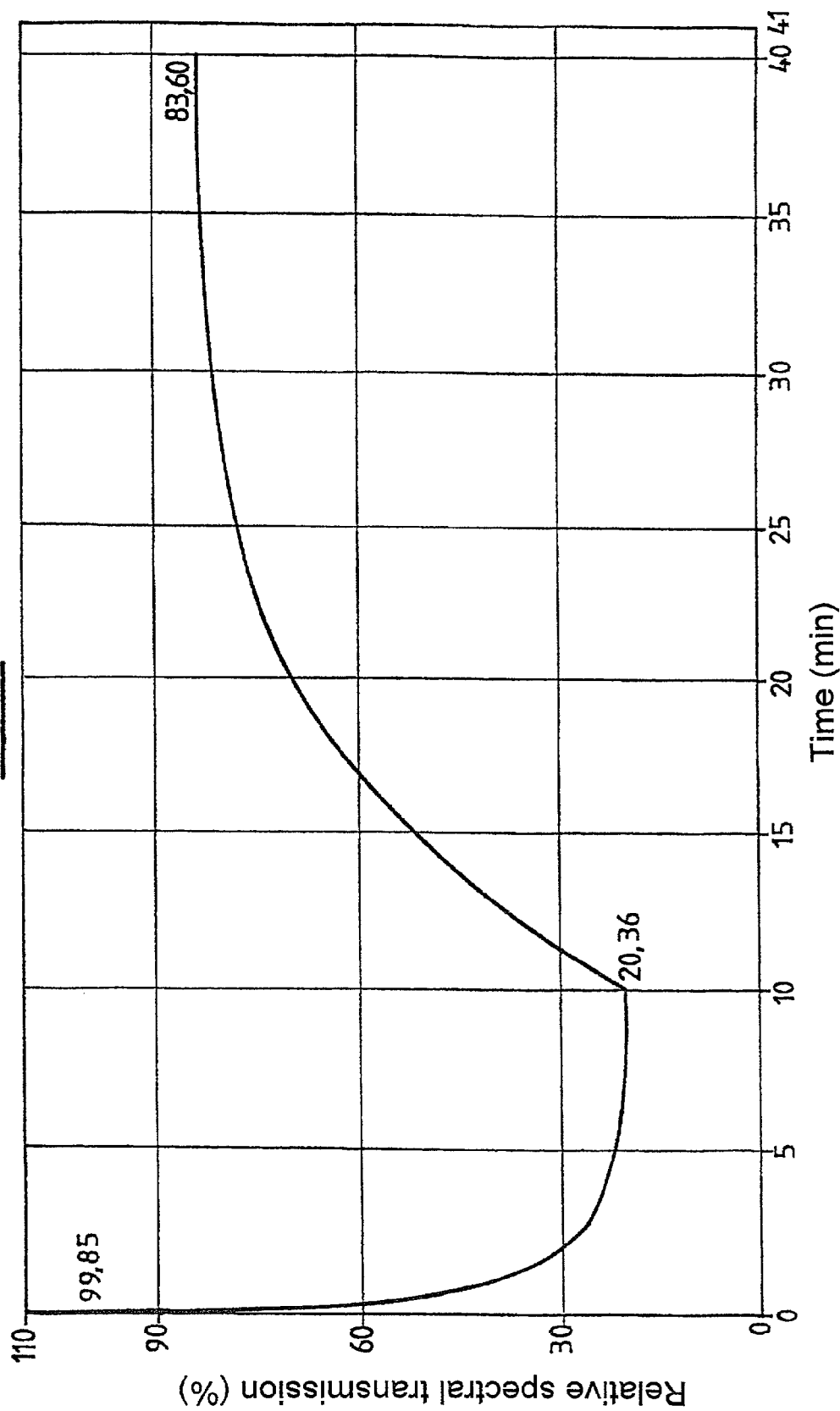

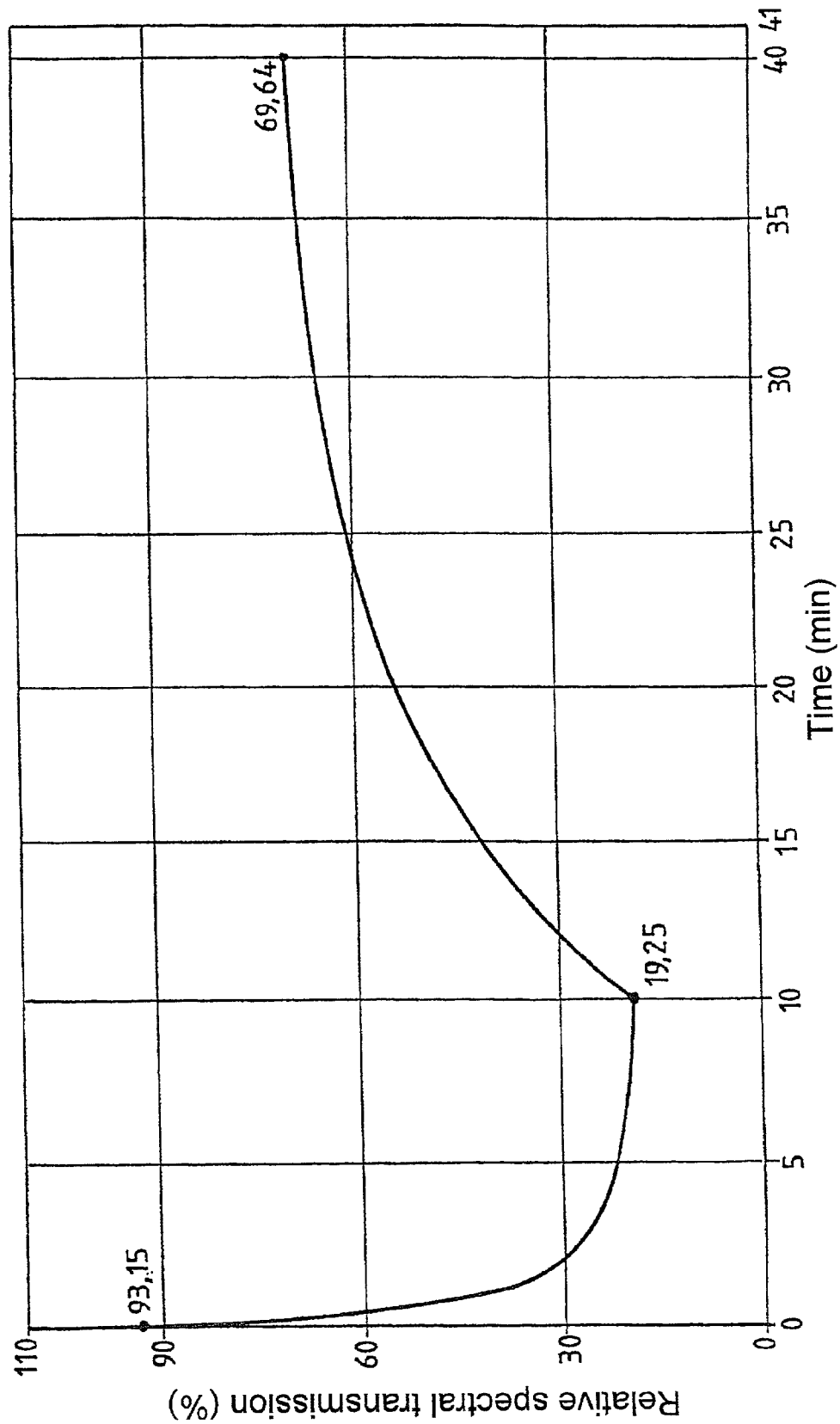
FIG_2

METHOD FOR PREPARING A LATEX WITH PHOTOCHROMIC PROPERTIES AND USES THEREOF, PARTICULARLY IN OPHTHALMOLOGY

This application is a continuation of PCT Application No. PCT/FR00/00397 filed 17 Feb. 2000, which claims priority to French Application No. 99 02437 filed 26 Feb. 1999.

The object of the present invention is a method for preparing a photochromic latex, photochromic thin films obtained from the latter, and articles coated with such thin films, in particular photochromic ophthalmic lenses.

The phenomenon of photochromism has been known for many years. A compound is described as photochromic when, for example, this compound, irradiated with a light beam containing some wavelengths in the ultraviolet region, changes colour and returns to its original colour when the irradiation ceases.

There are many applications of this phenomenon, but one of the most useful known applications is in the ophthalmic optics field, in the manufacture of lenses or spectacle glasses, so as to filter the light radiation as a function of its intensity.

The incorporation of photochromic compounds into an organic material constituting an ophthalmic lens gives a glass whose weight is considerably less than that of conventional lenses composed of inorganic glass containing silver halides as photochromic agents.

A widely used method for manufacturing ophthalmic lenses from photochromic organic material is the method known as "thermal transfer", in which the organic photochromic compounds, such as spirooxazines or chromenes, are applied to the lens by means of a temporary support such as a varnish, then the coated lens is heated so as to cause the transfer of the photochromic compound of the varnish onto the main surface of the lens. This method is especially disclosed in patents U.S. Pat. Nos. 4,286,957 and 4,880,667.

Another technique known as "cast-in-place" consists of incorporating the photochromic organic compounds into a polymerizable mixture leading to a transparent organic material, introducing this into a mould and then initiating its polymerization.

After removal from the mould, a photochromic ophthalmic lens is obtained whose photochromic pigments are incorporated into the bulk of this lens.

This latter technique has two major disadvantages:

It requires considerable quantities of photochromic pigments, which are compounds whose synthesis is costly.

The initiators used for the polymerization degrade the photochromic pigments, which tends to cause a reduction in their photochromic performance. In addition, the presence of the degradation products, which are generally coloured, could change the appearance of the final lens, rendering it unsuitable for its use.

In addition, in the two above techniques, since the performances of the photochromic pigments are closely dependent on the material in which they are incorporated, it has been necessary to develop specific organic materials suitable for the incorporation of such pigments.

However, some organic materials used in ophthalmic optics such as polycarbonates (thermoplastic materials generally transformed by injection moulding) have a polymer matrix which is unsuitable for photochromism.

An advantageous technique which is an alternative to the thermal transfer and cast-in-place techniques comprises the application of a photochromic coating onto a preformed ophthalmic lens.

The nature of the material constituting the ophthalmic lens on which the photochromic coating is applied is thus no longer relevant.

Such a technique is disclosed in principle, for example in the patent EP-A-146136 and more particularly, in the case of photochromic polyurethane varnishes, in the patent application WO 98/37115.

It is thus desirable to develop new photochromic varnishes usable in the ophthalmic optics field which show improved properties, in particular given the international directives, aimed at the reduction of the use of organic solvents.

The object of the invention is a method for preparing a latex with photochromic properties, whose properties change little or not at all over time, leading after drying to thin transparent photochromic films, usable on ophthalmic lenses.

Aqueous emulsions containing a photochromic pigment have already been described in the prior art.

The Russian patent RU-2095836 discloses a method for obtaining photochromic microcapsules, whose main application is as authentification agents in official documents.

According to the method disclosed in this patent, a photochromic compound, in this case 6-nitro-1,3,3-trimethylstyrene (2H-1-benzopyran)-2,2-indoline, is dissolved in a mixture of methacrylates of polyfunctional oligoesters (in this case a mixture of ethylene glycol di(meth)acrylate (DMEG) and triethylene glycol di(meth)acrylate), in the presence of a benzoyl peroxide initiator.

The mixture is emulsified in an aqueous solution containing an ammonium salt of a butyl acrylate-methacrylic acid copolymer.

A mixture of a melamine-formaldehyde-polyvinyl alcohol resin is introduced into the resulting emulsion, then a crosslinked envelope is formed, while simultaneously polymerising the core of the microcapsules.

Moreover, the microcapsules thus formed have a diameter of 3 to 5 µm, which makes them unsuitable for depositing thin layers of 3 to 20 µm.

The microcapsule suspension obtained also has a residual pink colour, in the absence of irradiation, in the non-excited state, which is not desirable for ophthalmic use.

The method of preparing a latex with photochromic properties according to the invention comprises the following steps:

(1) preparing an aqueous emulsion (I) of a composition A comprising
at least one organic monomer Z with a C=C group, capable of free-radical polymerization, and
one or more organic photochromic compounds containing a nucleus of formula:

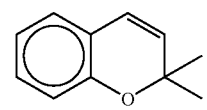

(2) polymerising composition A of organic monomers in the presence of a water-soluble initiator to obtain said latex with photochromic properties.

The inventors have observed that by polymerising the monomer or monomers Z and the photochromic compound as defined above in aqueous emulsion, in other words with a water-soluble initiator, a photochromic latex is unexpectedly obtained with the desired properties.

As is well known, latexes are stable dispersions of one or more polymers in an aqueous medium.

Without wishing to give a limitative interpretation to the invention, it is possible that the presence of the initiator in aqueous solution reduces the contact between the radicals generated in the aqueous phase and the photochromic compound present in the organic phase, and that the possible degradation of the photochromic compound is thus minimized.

The recommended polymerizable monomers Z with C=C groups are monomers of type alkyl (meth)acrylate, preferably of type mono(meth)acrylate.

The preferred monomers Z are selected from the $C_1$–$C_{10}$ alkyl (meth)acrylates and preferably mixtures of $C_2$–$C_{10}$ alkyl acrylate and $C_1$–$C_3$ alkyl methacrylate monomers.

In addition, it has been observed that the performances of the photochromic pigments are considerably improved when they are incorporated into matrices with a low glass transition temperature.

Thus, it is in general desirable that the final polymer resulting from the drying of the latex obtained according to the method of the invention has a glass transition temperature Tg lower than or equal to 0° C.

Thus, at least one monomer Z is preferably capable of forming by homopolymerization a homopolymer with a Tg lower than 0° C., and preferably lower than −20° C., and even more preferably lower than −30° C. These monomers are subsequently referred to as "low Tg monomers".

Low Tg monomers which are particularly recommended include butyl acrylate (Tg homopolymer: −55° C.), propyl acrylate and ethyl acrylate.

It is generally desirable to use a mixture of monomers Z composed of a low Tg monomer defined above and at least a second monomer Z able to lead by homopolymerization to a homopolymer with a higher Tg, which improves the mechanical properties. These monomers are subsequently referred to as "high Tg monomers".

High Tg monomers include methyl methacrylate (Tg homopolymer:105° C.).

The low Tg monomer preferably represents at least 40%, and preferably at least 50% by weight of the total weight of monomers Z in the composition A.

A preferred composition A contains a mixture of propyl, butyl or hexyl acrylate and methyl, ethyl or propyl methacrylate.

The composition A may also contain one or more crosslinking agents, such as for example the poly(alkylene glycol) di(meth)acrylates. Preferred crosslinking agents include glycidyl methacrylate (GMA), which causes both intraparticular and interparticular crosslinking (in the presence of piperazine), and di(ethylene glycol) dimethacrylate.

These crosslinking agents may represent up to 10%, but generally represent up to 5% by weight of composition A.

The emulsion copolymerisation of composition A leads, depending on the case, to homopolymer particles or to random copolymer particles.

The invention also comprises in its scope the case of latexes with at least biphasic particles, in particular with a structure of the core/skin type.

Such a structure is obtained by adding to the latex produced from the at least partial polymerization of composition A a second aqueous emulsion (II) containing a composition B of at least one organic monomer capable of free-radical polymerization, then by polymerising said composition B.

The monomers of composition B are preferably selected from the same families of monomers as those used in composition A.

In this case the monomers Z used in composition B may lead to a homopolymer with glass transition temperature higher than 0° C., since the photochromic pigments are located in the core of the particles.

The more rigid skin leads to better mechanical properties of the films finally obtained.

The organic photochromic compounds which may be used within the scope of the invention are photochromic compounds containing a nucleus of formula:

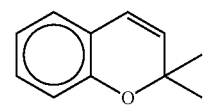

These photochromic compounds preferably do not contain an indoline ring.

The photochromic compounds are preferably naphthopyrans, in particular those disclosed in documents U.S. Pat. No. 5,066,818, WO 93/17071, F-A-2688782.

The preferred naphthopyrans include naphthopyrans with two substituted or unsubstituted phenyl groups on the carbon adjacent to the oxygen of the pyran ring.

It has been observed that such photochromic compounds show excellent resistance to degradation by radicals in aqueous medium.

The photochromic compound is introduced in a quantity sufficient to obtain the desired photochromic effect in the final films.

The concentrations in photochromic compound generally vary from 2 to 5% by weight with respect to the weight of polymerizable monomers present in the latex.

The water-soluble initiators used for the polymerization of the compositions of the invention are salts and compounds with at least one hydrophilic function.

These salts and compounds include alkali metal and ammonium persulfates, in particular sodium or potassium persulfate, hydrogen peroxide, and 2,2'-azobis(2-amidinopropane) dihydrochloride.

Partially water-soluble peroxides such as succinic peracid and t-butyl hydroperoxide may also be used.

Redox systems such as the persulfates combined with a ferrous ion may also be used.

Other initiators are cumyl hydroperoxide or hydrogen peroxide in the presence of ferrous, sulfite or bisulfite ions.

Among these initiators, the preferred initiators are the alkali metal persulfates.

Sodium or potassium persulfate is preferably used, rather than the ammonium salt, which may cause pH variations which can generate coloured degradation products of the photochromic compound.

The quantity of initiator is variable and may be adapted according to the case.

In general, the quantity of initiator varies from 0.1 to 1% by weight with respect to the total weight of polymerizable monomers present in the latex.

The latex is prepared by mixing the photochromic compound with the monomer(s) Z, generally in aqueous medium, preferably in the presence of surface-active agents, then causing the polymerization by means of an initiator which is preferably added into the above mixture progressively, while agitating vigorously.

The surface-active agents may be ionic surface-active agents such as sodium dodecyl sulphate, dodecylbenzene sulphate, sodium sulfonate or the sulphates of ethoxylated fatty alcohols, nonionic such as the amphoteric or ethoxylated fatty alcohols. The preferred system is a combination of ionic and nonionic surface-active agents.

The aqueous emulsion of the composition may also contain a conventional buffering agent, which keeps the pH of the emulsion constant (preferably from 5 to 7) during the preparation of the latex.

The polymerization time generally varies from 30 minutes to several hours.

The initiator and the aqueous emulsion are preferably each introduced progressively into the reaction medium throughout the polymerization step.

During the polymerization, the temperature of the reaction mixture is generally between 50 and 90° C., this temperature being necessary to activate the initiator.

The mixture and the initiator are further preferably introduced concomitantly into an aqueous solution containing surface-active agents, this solution being termed "starting solution".

The latexes obtained by the method of the invention have a particle diameter of between 50 and 400 nm, preferably between 80 and 300 nm and even better between 150 and 250 nm.

The dry extract of the latexes generally represents from 30 to 50% by weight of the total weight of the latex and preferably from 40 to 50% by weight.

A dilution is possible, by addition of water, if it is wished to reduce the dry extract so as to obtain a thinner varnish.

The pH of the latexes according to the invention generally varies from 5 to 7.

The photochromic latexes according to the invention may be applied onto any type of substrate by conventional techniques known to a person skilled in the art, particularly:

by immersion in the bath of photochromic latex (dip coating) or by application onto the surface of the substrate followed by centrifugation to ensure a uniform application of the latex onto the surface.

The latex film is then dried under the following conditions:

Film drying temperature : ambient to 100° C.

Drying time: 5 minutes to 1 hour.

The thicknesses of the films obtained are fixed as a function of the extent of the photochromic effect desired.

Generally, and given the quantity of the photochromic compound present in the latex, the thickness varies from 3 to 20 µm and preferably from 5 to 15 µm.

The preferred substrates onto which the latexes obtained by the method of the invention are applied are any organic glass substrate currently used for organic ophthalmic lenses.

Polycarbonate (thermoplastic) substrates, in particular the ophthalmic lenses manufactured by the Gentex Optics company, are the substrates particularly recommended onto which the latexes obtained by the method of the invention are applied.

Among other suitable substrates are the substrates obtained by the polymerization of alkyl methacrylates, in particular $C_1$–$C_4$ alkyl methacrylates such as methyl (meth) acrylate and ethyl (meth)acrylate, allyl derivatives such as the allyl carbonates of linear or branched aliphatic or aromatic polyols, thio(meth)acrylics, thiourethanes, polyethoxylated aromatic (meth)acrylates such as the polyethoxylated bisphenolate dimethacrylates.

Recommended substrates include substrates obtained by polymerization of the allyl carbonates of polyols such as ethylene glycol bis(allyl carbonate), diethylene glycol bis (2-methyl carbonate), diethylene glycol bis(allyl carbonate), ethylene glycol bis(2-chloroallyl carbonate), triethylene glycol bis(allyl carbonate), 1,3-propanediol bis(allyl carbonate), propylene glycol bis(2-ethylallyl carbonate), 1,3-butenediol bis(allyl carbonate), 1,4-butenediol bis(2-bromoallyl carbonate), dipropylene glycol bis(allyl carbonate), trimethylene glycol bis(2-ethylallyl carbonate), pentamethylene glycol bis(allyl carbonate), isopropylene bisphenol A bis(allyl carbonate).

The substrates particularly recommended are substrates obtained by polymerization of ethylene glycol bis(allyl carbonate), sold under the trade name CR 39® by the company PPG INDUSTRIES (lens ORMA® ESSILOR).

Among other recommended substrates are substrates obtained by polymerization of thio(meth)acrylic monomers, such as those disclosed in the French patent application FR-A-2 734 827.

The substrates may obviously be obtained by polymerising mixtures of the above monomers.

It is possible to apply other coatings onto the photochromic film such as anti-abrasion coatings and anti-reflection coatings.

The hard anti-abrasion coatings may be any anti-abrasion coatings known in the ophthalmic optics field.

Among the hard anti-abrasion coatings recommended in the present invention are coatings obtained from compositions based on silane hydrolysate, in particular the hydrolysate of epoxysilane, as described in the French patent application No 93 026 49 and the patent U.S. Pat. No. 4,211,823.

As stated above, the ophthalmic lens according to the invention may additionally contain an anti-reflection coating deposited on the anti-abrasion coating.

As an example, the anti-reflection coating may be composed of a mono- or multilayer film, of dielectric materials such as SiO, $SiO_2$, $Si_3N_4$, $TiO_2$, $ZrO_2$, $Al_2O_3$, $MgF_2$ or $Ta_2O_5$, or their mixtures.

It is thus possible to prevent the appearance of a reflection at the lens-air interface.

This anti-reflection coating is generally applied by vacuum deposit according to one of the following techniques:

by evaporation, optionally assisted by ion beam;
by ion-beam spraying;
by cathodic spraying;
by chemical vapour deposit assisted by plasma.

In addition to vacuum deposit, it is also possible to deposit an inorganic layer by the sol/gel route (for example from tetraethoxysilane hydrolysate).

In the case of a single layer film, its optical thickness must be equal to $\lambda/4$ ($\lambda$ is a wavelength between 450 and 650 nm).

In the case of a multilayer film comprising three layers, a combination may be used corresponding to the respective optical thicknesses $\lambda/4$, $\lambda/2$, $\lambda/4$ or $\lambda/4$, $\lambda/4$, $\lambda/4$.

It is also possible to use an equivalent film formed by more layers, in the place of any number of the layers which are part of the above three layers.

The present invention also relates to latexes with photochromic properties comprising polymer particles as defined above which contain an effective quantity of at least one photochromic compound as defined above.

The following examples illustrate the present invention.

In the examples, except where otherwise stated, all the percentages and parts are expressed by weight.

Preparation of a Random butyl acrylate (ABu)-methyl methacrylate (MMA) Latex with Photochromic Properties.

Preparation of the Starting Solution 0.82 g of surface-active agent DISPONIL® A 3065 (mixture of fatty alcohols of 30 EO, 65% active matter) and 0.55 g of surface-active agent DISPONIL® FES ($C_{12-14}(OCH_2CH_2)_{12}OSO_3$—$Na^+$) were dissolved in 148.9 g of water. The mixture was agitated for 10 minutes, then introduced into a double-wall reactor whose cap had five inlets (for the nitrogen, the thermometer, the stirrer, the initiator inlet and the emulsion inlet).

The mixture Is degassed for 1 hour at 70° C.

Preparation of the Emulsion I

At the same time, 7.36 g of DISPONIL® A 3065 and 4.8 g of DISPONIL® FES were dissolved in 164.8 g of water buffered by the addition of 0.57 g of $NaHCO_3$. The solution was agitated, then, still under agitation, a mixture was added of 185.7 g of butyl acrylate and 79.6 g of methyl methacrylate into which had previously been incorporated 11.7 of photochromic compound Pch: 8-methoxy-3-(2-fluorophenyl)-3-(4-methoxyphenyl)-3H-naphtho[2, 1-b]pyran, whose synthesis is described in the document WO 93/17071. The quantity introduced corresponded to 4.41% by weight of compound Pch with respect to the weight of the monomers ABu and MMA.

Preparation of the Initiator Solution

In parallel, 1.6 g of sodium persulfate were dissolved in 12.4 g of water.

Preparation of the Photochromic Latex

The emulsion I and the initiator solution were added to the reactor, by the appropriate inlets, over 4 hours and in parallel. (The addition of the first drop of sodium persulfate was taken as time zero of the polymerization reaction). The reaction temperature was 70° C.

The product obtained was a photochromic random 70/30 butyl acrylate/methyl methacrylate latex according to the invention with the following properties:

| Dry extract (%) | Particle size (nm) | pH |
|---|---|---|
| 42 | 180 | 7 |

Preparation of a Second Photochromic Random ABu(60)-MMA(40) Latex

The latex was prepared under the same conditions as above except that the quantities of monomers used were:
ABu 161.9 g
MMA 107.4 g The quantity of photochromic compound Pch added was 4.34% with respect to the weight of the ABu and MMA monomers.

The product obtained was a photochromic random 60/40 butyl acrylate/methyl methacrylate latex with the following properties:

| Dry extract (%) | Particle size (nm) | pH |
|---|---|---|
| 43 | 190 | 7 |

Preparation of a 70/30 ABU-MMA Latex with a Core/Skin Structure

The core of the latex was prepared by adding the emulsion I over 2 h 48 min in a first stage, then the skin by adding emulsion II over 1 h 12 min in a second stage.

The initiator solution was added in parallel to the reaction mixture, over 4 hours as from the addition of the first drop of emulsion I.

The compositions of the starting solution, emulsions I and II and the initiator solution are given in the following table:

| | Starting solution | emulsion I | emulsion II | Initiator |
|---|---|---|---|---|
| Water (g) | 148.9 | 115.4 | 49.4 | 12.4 |
| DISP.3065 (g) (2% w/w) | 0.82 | 5.15 | 2.21 | |
| DISP.FES (g) (2%) | 0.55 | 3.36 | 1.44 | |
| NaHCO3 (g) | | 0.4 | 0.17 | |
| ABu (g) | | 185.7 | | |
| MMA (g) | | | 79.6 | |
| Sodium persulfate (g) | | | | 1.6 |
| Pch (4.41% w/w) | | 11.7 | | |

The product obtained was a photochromic core/skin 70/30 butyl acrylate/methyl methacrylate latex according to the invention with the following properties:

| Dry extract (%) | Particle size (nm) | pH |
|---|---|---|
| 44 | 210 | 7 |

BRIEF DESCRIPTION OF THE DRAWINGS

The performances of the photochromic compounds deposited as film are shown on FIGS. 1 and 2 (Spectral transmission as a function of time).

(Random ABu(70)/MMA(30) latex (FIG. 1), and core/skin latex described above (FIG. 2)).

The latex films were deposited on plain ORMA® lenses by centrifugation at thickness 6 μm.

The spectro-kinetic properties of the films were measured under the following conditions:
Temperature : 20° C. (air regulation)
No visible lighting
UV lighting: 10.2 W/m$^2$
10 minutes coloration by UV irradiation as defined above/30 minutes decolouration after stopping UV irradiation.

The invention claimed is:

1. A method for preparing a latex with photochromic properties comprising:
preparing an aqueous emulsion (I) of a composition A comprising:
at least one organic monomer Z, wherein said at least one monomer is further defined as comprising a C=C group and being capable of free-radical polymerization, and
one or more organic photochromic compounds containing a nucleus of formula:

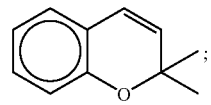

polymerizing composition A in the presence of a water-soluble initiator to obtain particles of an at least partially polymerized latex with photochromic properties;

adding to the particles of an at least partially polymerized latex a second aqueous emulsion (II) containing a composition B comprising at least one organic monomer capable of free-radical polymerization; and polymerizing the composition B to obtain a latex comprising at least biphasic photochromic particles.

2. The method of claim 1, wherein composition A comprises only one type of organic monomer Z.

3. The method of claim 1, wherein composition A comprises more than one type of organic polymer Z.

4. The method of claim 1, wherein the latex is a fully polymerized latex.

5. The method of claim 1, wherein the biphasic latex is further defined as comprising a core/skin structure.

6. The method of claim 1, wherein the water-soluble initiator is introduced progressively to the aqueous emulsion I, during the polymerization.

7. The method of claim 1, wherein the water-soluble initiator and the aqueous emulsion (I) are each introduced progressively into a reaction medium throughout polymerization.

8. The method of claim 1, wherein the water-soluble initiator is an alkali or ammonium persulfate.

9. The method of claim 8, wherein the water-soluble initiator is potassium or sodium persulfate.

10. The method of claim 1, wherein the percentage by weight of the initiator with respect to total organic weight of monomer or monomers capable of free-radical polymerization used for the preparation of the latex is between 0.1 and 1%.

11. The method of claim 1, wherein the organic monomer Z is an alkyl (meth)acrylate monomer.

12. The method of claim 1, wherein composition A is further defined as comprising at least one monomer Z which is further defined as a low Tg monomer which leads to a homopolymer whose glass transition temperature is less than or equal to 0° C.

13. The method of claim 12, wherein the low Tg monomer represents at least 40% by weight of the monomers capable of free-radical polymerization.

14. The method of claim 1, wherein the particles of the latex are further defined as having a diameter of 50 to 400 nm.

15. The method of claim 1, wherein a dry extract of the latex represents from 30 to 50% of the total weight of the latex.

16. The method of claim 1, wherein the pH of the latex is between 5 and 7.

17. A latex with photochromic properties, further defined as comprising particles of a polymer material resulting from the free-radical polymerization of at least one monomer Z with a C=C group comprising one or more organic photochromic compound comprising a nucleus of formula:

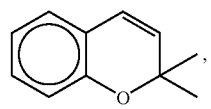

the particles of said polymer material having an average size of between 50 and 400 nm and a biphasic structure of the core/skin type, and wherein the organic photochromic compound is further defined as not containing an indoline ring.

18. The latex of claim 17, wherein the particles are further defined as having an average size of between 80 and 300 nm.

19. The latex of claim 18, wherein the particles are further defined as having an average size between 150 and 250 nm.

20. The latex of claim 17, wherein the organic photochromic compound is contained in the core of the particles.

21. The latex of claim 17, wherein a dry extract of the latex represents from 30 to 50% of the total weight of the latex.

22. A substrate comprising a dry latex film with photochromic properties, the latex further defined as comprising particles of a polymer material resulting from the free-radical polymerization of at least one monomer Z with a C=C group comprising one or more organic photochromic compound comprising a nucleus of formula:

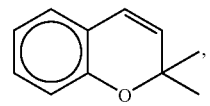

the particles of said polymer material having an average size of between 50 and 400 nm and a biphasic structure of the core/skin type, and wherein the organic photochromic compound is further defined as not containing an indoline ring.

23. The substrate of claim 22, wherein the film has a thickness of between 3 and 20 µm.

24. The substrate of claim 22, further defined as comprising an anti-abrasion coating.

25. The substrate of claim 22, further defined as comprising an anti-reflection coating.

26. The substrate of claim 22, further defined as comprising an anti-abrasion coating on the latex film and an anti-reflection coating on the anti-abrasion coating.

27. The substrate of claim 22, further defined as an ophthalmic lens.

28. The method of claim 14, wherein the particles of the latex are further defined as having an average size of between 80 and 300 nm.

29. The method of claim 28, wherein the particles are further defined as having an average size between 150 and 250 nm.

30. The method of claim 1, wherein the organic photochromic compound is further defined as not containing an indoline ring.

31. The method of claim 30, wherein the particles of polymer material have a biphasic structure of the core/skin type.

32. The method of claim 31, wherein the organic photochromic compound is contained in the core of the particles.

33. The method of claim 1, wherein the latex is further defined as a dry latex film.

34. The method of claim 33, wherein the dry latex film has a thickness of between 3 and 20 µm.

35. The method of claim 1, wherein a substrate comprises the latex.

36. The method of claim 35, wherein the substrate further comprises an anti-abrasion coating.

37. The method of claim 35, wherein the substrate further comprises an anti-reflection coating.

38. The method of claim 35, wherein the substrate comprises an anti-abrasion coating on the latex film and an anti-reflection coating on the anti-abrasion coating.

39. The method of claim 35, wherein the substrate is further defined as an ophthalmic lens.

40. A method for preparing a latex with photochromic properties comprising:

preparing an aqueous emulsion (I) of a composition A comprising:

at least one organic monomer Z, wherein said at least one monomer is further defined as comprising a C═C group and being capable of free-radical polymerization, and one or more organic photochromic compounds containing a nucleus of formula:

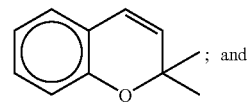
; and polymerizing composition A in the presence of a water-soluble initiator to obtain particles of an at least partially polymerized latex with photochromic properties, wherein the particles have a biphasic structure of the core/skin type, and wherein the organic photochromic compound is further defined as not containing an indoline ring.

41. The method of claim 40, wherein the organic photochromic compound is contained in the core of the particles.

* * * * *